United States Patent
Nakanishi et al.

(10) Patent No.: US 8,249,407 B2
(45) Date of Patent: Aug. 21, 2012

(54) OPTICAL FIBER AND OPTICAL CABLE

(75) Inventors: Tetsuya Nakanishi, Yokohama (JP);
Fumiaki Satou, Yokohama (JP);
Katsuyuki Aihara, Yokohama (JP);
Hiroshi Miyano, Yokohama (JP);
Takashi Sasaki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/304,163

(22) Filed: Nov. 23, 2011

(65) Prior Publication Data
US 2012/0141077 A1 Jun. 7, 2012

Related U.S. Application Data

(63) Continuation of application No. 13/113,668, filed on May 23, 2011, now Pat. No. 8,081,856, which is a continuation of application No. 12/663,178, filed as application No. PCT/JP2009/052982 on Feb. 20, 2009, now Pat. No. 8,081,855.

(30) Foreign Application Priority Data

Feb. 22, 2008 (JP) .................................. 2008-041821

(51) Int. Cl.
*G02B 6/036* (2006.01)
(52) U.S. Cl. ........ 385/126; 385/100; 385/122; 385/123; 385/124; 385/125; 385/127; 385/128
(58) Field of Classification Search .................. 385/100, 385/122–128
See application file for complete search history.

(56) References Cited

U.S. PATENT DOCUMENTS 4,802,733 A 2/1989 Bachmann et al.
(Continued)

FOREIGN PATENT DOCUMENTS
EP 0 127 227 A2 5/1984
(Continued)

OTHER PUBLICATIONS

Matsuo, S., et al., "Low-Bending-Loss and Low-Splice-Loss Single-Mode Fibers Employing a Trench Index Profile", Joint Special Section on Recent Progress in Optoelectronics and Communications, May 2005, pp. 889-896, vol. E88-C.No. 5, The Institute of Electronics, Information and Communication Engineers.

(Continued)

*Primary Examiner* — Brian M. Healy
*Assistant Examiner* — Guy Anderson
(74) *Attorney, Agent, or Firm* — McDermott Will & Emery LLP

(57) ABSTRACT

An optical fiber that has a small bending loss can be securely prevented from being fractured due to accidental bending during installation or other operations, and is compliant with the G. 652 standard. The optical fiber includes a core, a first cladding, a second cladding and a third cladding. The relative refractive index difference $\Delta_1$ of the core is in the range of 0.3% to 0.38%, the relative refractive index difference $\Delta_2$ of the first cladding is equal to or smaller than 0%, and the relative refractive index difference $\Delta_3$ of the second cladding is in the range of −1.8% to −0.5%. The inner radius $r_2$ and the outer radius $r_3$ of the second cladding satisfy the expression "$0.4r_2+10.5<r_3<0.2r_2+16$", and the inner radius $r_2$ of the second cladding is equal to or greater than 8 µm.

19 Claims, 18 Drawing Sheets

U.S. PATENT DOCUMENTS

| | | | |
|---|---|---|---|
| 4,838,643 A * | 6/1989 | Hodges et al. | 385/127 |
| 4,852,968 A | 8/1989 | Reed | |
| 5,721,800 A | 2/1998 | Kato et al. | |
| 6,266,467 B1 | 7/2001 | Kato et al. | |
| 6,510,268 B1 | 1/2003 | De Montmorillon et al. | |
| 6,694,079 B1 | 2/2004 | Matsuo et al. | |
| 6,901,197 B2 | 5/2005 | Hasegawa et al. | |
| 7,272,289 B2 | 9/2007 | Bickham et al. | |
| 7,356,234 B2 | 4/2008 | De Montmorillon et al. | |
| 7,433,566 B2 | 10/2008 | Bookbinder et al. | |
| 7,450,806 B2 | 11/2008 | Bookbinder et al. | |
| 7,505,660 B2 | 3/2009 | Bickham et al. | |
| 7,526,166 B2 | 4/2009 | Bookbinder et al. | |
| 7,555,187 B2 | 6/2009 | Bickham et al. | |
| 2002/0122644 A1 | 9/2002 | Birks et al. | |
| 2002/0159735 A1* | 10/2002 | Edvold et al. | 385/127 |
| 2003/0081921 A1 | 5/2003 | Sillard et al. | |
| 2003/0108318 A1* | 6/2003 | Arai et al. | 385/127 |
| 2006/0018613 A1* | 1/2006 | Sillard et al. | 385/124 |
| 2006/0039665 A1 | 2/2006 | Matsuo et al. | |
| 2006/0093297 A1* | 5/2006 | Sako et al. | 385/126 |
| 2006/0115224 A1 | 6/2006 | Kutami et al. | |
| 2006/0177186 A1* | 8/2006 | Rossi | 385/100 |
| 2007/0014525 A1* | 1/2007 | Sillard et al. | 385/124 |
| 2007/0041688 A1* | 2/2007 | Jetten et al. | 385/124 |
| 2007/0127878 A1* | 6/2007 | Demontmorillon et al. | 385/124 |
| 2007/0147751 A1 | 6/2007 | Fini | |
| 2007/0147756 A1 | 6/2007 | Matsuo et al. | |
| 2007/0189684 A1 | 8/2007 | Matsuo et al. | |
| 2007/0196061 A1 | 8/2007 | Bickham et al. | |
| 2007/0280615 A1 | 12/2007 | De Montmorillon et al. | |
| 2008/0013905 A1 | 1/2008 | Bookbinder et al. | |
| 2008/0056654 A1 | 3/2008 | Bickham et al. | |
| 2008/0056658 A1 | 3/2008 | Bickham et al. | |
| 2008/0101755 A1 | 5/2008 | Matsuo et al. | |
| 2008/0317410 A1 | 12/2008 | Griffioen et al. | |

FOREIGN PATENT DOCUMENTS

| | | |
|---|---|---|
| EP | 1 785 754 A1 | 5/2007 |
| JP | 09-288220 | 11/1997 |
| JP | 2006-154421 | 6/2006 |
| JP | 2007-140510 | 6/2007 |
| JP | 2007-279739 | 10/2007 |
| WO | WO 2004/092794 A1 | 10/2004 |
| WO | WO 2006/016572 A1 | 2/2006 |
| WO | WO 2006/025231 A1 | 3/2006 |

OTHER PUBLICATIONS

Ikeda, M., "Low Bending Loss Optical Fiber with Reduced Splice Loss", IEICE Technical Report, Aug. 2003, pp. 35-40, vol. 103 No. 255, The Institute of Electronics, Information and Communication Engineers.

Himeno, K., et al., "Low-Bending-Loss Single-Mode Fibers for Fiber-to-the-Home", Journal of Lightwave Technology, Nov. 2005, pp. 3494-3499, vol. 23 No. 11.

Nunome, T., et al., "Chromatic dispersion and splice characteristics of trench-assisted bend-insensitive fibers", IEICE Technical Report, May 2007, pp. 11-14, vol. 107 No. 52.

Nunome, T., et al., "Splice Characteristics of Trench-Assisted Bend-Insensitive Fiber", Proceedings of the 2007 Communication Society Conference of IEICE, Aug. 2007, p. 207, The Institute of Electronics, Information and Communication Engineers.

De Montmorillon, L.A.D., et al., "Bend-Optimized G.652D Compatible Trench-Assisted Single Mode Fibers", Proceedings of the 55th International Wire & Cable Symposium (IWCS), Nov. 2006, pp. 342-347, Rhode Island USA.

Kuyt, G., et al., "The Impact of New Bend-insensitive Single Mode Fibers on FTTH Connectivity and Cable Designs", Proceedings of the 56th International Wire & Cable Symposium (IWCS), Nov. 2007, pp. 363-371, Lake Buena Vista Florida USA.

Y. Mitsunaga et al., "Failure prediction for long length optical fiber based on proof testing," J. Appl. Phys. vol. 53, No. 7, Jul. 1982, pp. 4847-4853.

United States Notice of Allowance issued in U.S. Appl. No. 12/663,178 dated Sep. 22, 2011.

Extended European Search Report issued in European Patent Application No. 09712763.3, dated Aug. 31, 2011.

Chinese Office Action, with English translation, issued in Chinese Patent Application No. 200980000329.5, dated Dec. 16, 2011.

* cited by examiner (a)

| Optical fiber | r1 [μm] | r2 [μm] | r3 [μm] | Δ1 [%] | Δ2 [%] | Δ3 [%] | Bending loss R4@1625nm [dB/turn] | Bending loss R5@1550nm [dB/turn] | Bending loss R7.5@1550nm [dB/turn] | Bending loss R10@1550nm [dB/turn] | MFD [μm] | λcc [nm] | Dispersion slope [ps/nm²/km] | λ0 [nm] |
|---|---|---|---|---|---|---|---|---|---|---|---|---|---|---|
| A | 3.99 | 9.98 | 16.01 | 0.34 | -0.01 | -0.73 | 1.020 | 0.334 | 0.056 | 0.01719 | 8.9 | 1160 | 0.0895 | 1301 |
| B | 4.19 | 13.78 | 17.46 | 0.35 | -0.01 | -1.02 | 0.400 | 0.279 | 0.082 | 0.025 | 8.9 | 1180 | 0.0852 | 1306 |
| C | 4.00 | 15.12 | 18.75 | 0.34 | -0.02 | -1.70 | 0.214 | 0.045 | 0.015 | 0.013 | 9 | 1230 | 0.0851 | 1304 |
| D | 4.02 | 9.55 | 15.02 | 0.36 | -0.04 | -0.53 | 1.450 | 0.784 | 0.098 | 0.048 | 9 | 1240 | 0.0899 | 1302 |
| E | 4.22 | 13.10 | 19.00 | 0.35 | -0.02 | -0.73 | 0.200 | 0.059 | 0.012 | 0.01335 | 8.9 | 1275 | 0.0853 | 1303 |
| F | 3.95 | 13.10 | 15.75 | 0.33 | -0.02 | -0.53 | 1.681 | 2.820 | 0.235 | 0.1536 | 8.9 | 1160 | 0.8908 | 1312 |
| G | 3.95 | 8.02 | 15.11 | 0.35 | -0.03 | -1.00 | 0.105 | 0.118 | 0.024 | 0.0123 | 8.8 | 1235 | 0.0908 | 1282 |
| H | 3.80 | 6.50 | 15.10 | 0.34 | -0.08 | -0.53 | 0.320 | 0.513 | 0.066 | 0.035 | 8.7 | 1200 | 0.0915 | 1272 |
| I | 3.67 | 15.75 | 24.55 | 0.36 | -0.01 | -0.53 | 0.078 | 0.037 | 0.008 | 0.00245 | 8.9 | 1410 | 0.844 | 1330 |
| J | 3.28 | 8.21 | 13.18 | 0.34 | -0.01 | -0.73 | 39.851 | 32.631 | 2.175 | 6.72E-01 | 8.3 | 1000 | 0.0923 | 1310 |

…

OPTICAL FIBER AND OPTICAL CABLE

RELATED APPLICATIONS

This application is a Continuation of U.S. application Ser. No. 13/113,668, filed on May 23, 2011, now U.S. Pat. No. 8,081,856, which is a Continuation of U.S. application Ser. No. 12/663,178, filed on Dec. 4, 2009, now U.S. Pat. No. 8,081,855, which is the U.S. National Phase under 35 U.S.C. §371 of International Application No. PCT/JP2009/052982, filed on Feb. 20, 2009, which in turn claims the benefit of Japanese Application No. 2008-041821, filed on Feb. 22, 2008, the entire contents of each of which are hereby incorporated by reference.

TECHNICAL FIELD

The present invention relates to an optical fiber compliant with the G. 652 standard, and an optical cable including the optical fiber.

BACKGROUND ART

The standard for single-mode optical fibers, which are most widely used for optical transmission systems, has been laid down by International Telecommunication Union (ITU) as the G. 652 standard. The G. 652 standard defines conditions that have to be satisfied by the single-mode optical fibers, including respective ranges of the mode field diameter at a wavelength of 1310 nm, the cable cut-off wavelength, the zero dispersion wavelength, and the dispersion slope at the zero dispersion wavelength.

For optical transmission systems such as FTTH (fiber to the home), in which optical fibers are laid down to individual homes, and FTTC (fiber to the curb), in which optical fibers are laid down to curbs or utility poles, excess lengths of optical fibers have to be handled properly. To properly handle an excess length of an optical fiber, the excess length portion is wound and stored in a storage box. At this time, if the optical fiber has a small bending loss, the optical fiber can be wound with a small diameter, so that a small storage box can be used. Therefore, it is desirable that an optical fiber have a small bending loss. Japanese Unexamined Patent Application Publication No. 2007-140510 discloses an optical fiber that is compliant with the G. 652 standard and capable of considerably reducing the bending loss. However, this optical fiber is not prevented from being fractured when the optical fiber is accidentally bent during installation or other operations.

Patent Document 1: Japanese Unexamined Patent Application Publication No. 2007-140510

DISCLOSURE OF INVENTION

Problems to be Solved by the Invention

An object of the present invention to provide an optical fiber that complies with the G. 652 standard, has a small bending loss at a signal light wavelength, and is prevented from being fractured when the optical fiber is accidentally bent during installation or other operations. Another object of the present invention is to provide an optical cable including the optical fiber.

Means for Solving the Problems

To solve the problem, provided is an optical fiber including a core having a refractive index $n_1$, a first cladding surrounding the core and having a refractive index $n_2$ smaller than the refractive index $n_1$, a second cladding surrounding the first cladding and having a refractive index $n_3$ smaller than the refractive index $n_2$, and a third cladding surrounding the second cladding and having a refractive index $n_4$ greater than the refractive index $n_3$. For the optical fiber, with respect to the refractive index $n_4$ of the third cladding, the relative refractive index difference of the core is in the range of 0.3% to 0.38%, the relative refractive index difference of the first cladding is in the range of −0.3% to 0.2%, and the relative refractive index difference of the second cladding is in the range of −1.8% to −0.5%. The inner radius $r_2$ of the second cladding and the outer radius $r_3$ of the second cladding satisfy the expression, $$0.4r_2 + 10.5 < r_3 < 0.2r_2 + 16,$$

and the inner radius $r_2$ of the second cladding is equal to or greater than 8 μm. Moreover, the bending loss at a wavelength of 1550 nm and at a radius of curvature of 7.5 mm is smaller than 0.1 dB/turn, and the bending loss at a wavelength of 1625 nm and at a radius of curvature of 4 mm is greater than 0.1 dB/turn.

The radius $r_1$ of the core and the outer radius $r_2$ of the first cladding may satisfy the expression, $$\frac{r_2}{r_1} > -\frac{1}{3.3} \times \ln\left(\frac{0.1}{310 \times C_{OH}}\right),$$

and the transmission loss at a wavelength of 1380 nm may be smaller than 0.38 dB/km. Moreover, the mode field diameter at a wavelength of 1310 nm may be in the range of 8.6 μm to 9.2 μm, and the mode field diameter at a wavelength of 1550 nm may be in the range of 9.6 μm to 10.5 μm. Furthermore, a carbon coated layer may be disposed on a surface of a glass portion of the optical fiber.

According to other embodiments of the present invention, provided are an optical cable including the optical fiber according to the present invention, a sheath disposed around the optical fiber, and Kevlar disposed between the optical fiber and the sheath; and an optical cable including the optical fiber according to the present invention, and a sheath disposed around the optical fiber, but not including Kevlar, and having an outer diameter smaller than 3 mm. It is preferable that loss increases of these optical cables be smaller than 0.1 dB/km at a wavelength of 1550 nm and at a temperature of −30° C.

Moreover, provided are an optical cable including the optical fiber according to the present invention, a tension member disposed parallel to the optical fiber, and a sheath covering the optical fiber and the tension member, wherein a groove is formed along the optical fiber in a surface of the sheath; and an optical cable including the optical fiber according to the present invention, and a sheath covering the optical fiber, wherein the optical cable does not include a tension member, and a groove is formed along the optical fiber in a surface of the sheath. Provided is an optical cable including a plurality of the optical fibers according to the present invention, wherein the plurality of optical fibers are arranged in parallel and integrally covered with resin, and a loss increase during a mid-span access for wire splitting operation is smaller than 0.5 dB/km/s at a wavelength of 1550 nm. Provided is an optical cable including the optical fiber or a plurality of the optical fibers according to the present invention, and a sheath covering the optical fiber or the plurality of optical fibers that is/are helically coiled, wherein the radius of curvature of the optical fiber or each of the plurality of optical fibers is equal to or smaller than 7.5 mm.

Furthermore, provided are an optical module storing the optical fiber according to the present invention, and an optical

BRIEF DESCRIPTION OF DRAWINGS

FIG. 2 is a table of attributes of optical fibers A to D, which are embodiments of the present invention, and attributes of optical fibers E to J, which are comparative examples.

BEST MODES FOR CARRYING OUT THE INVENTION

Figure 1:
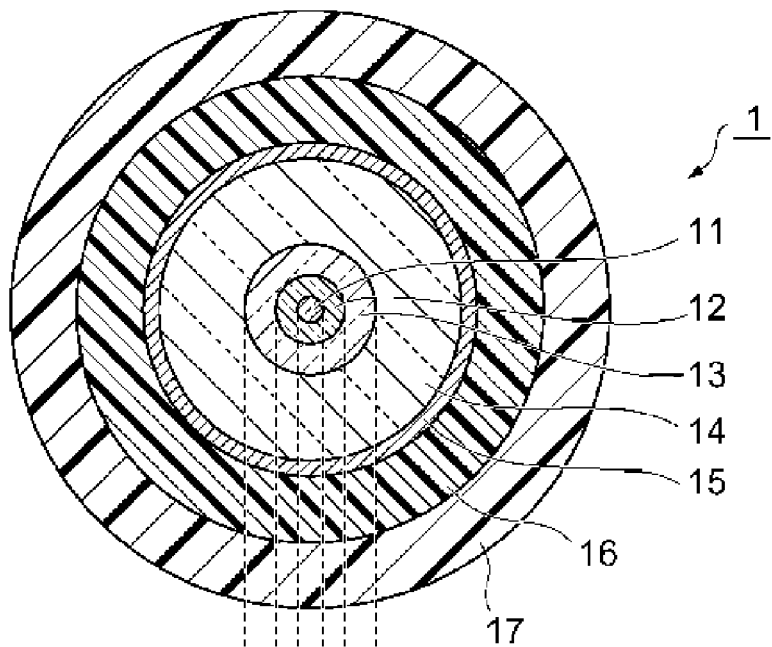
FIG. 1 illustrates an optical fiber according to an embodiment of the present invention, wherein section (a) is a sectional view of the optical fiber taken along a plane perpendicular to the fiber axis, and section (b) is a conceptual diagram showing the refractive index profile of the optical fiber.
Figure 1:
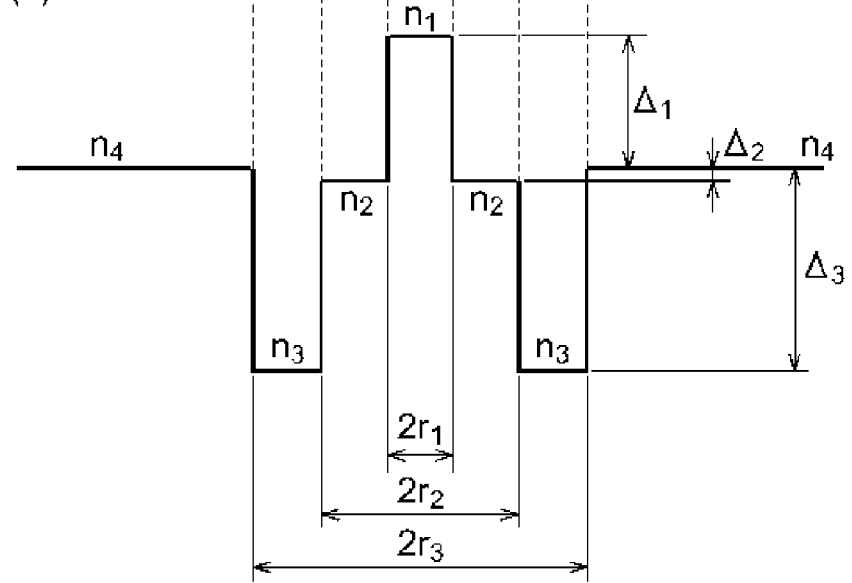

Hereinafter, embodiments of the present invention are described with reference to the drawings. The drawings, which are provided for explanative purposes only, do not limit the scope of the invention. In the drawings, the same numerals represent the same parts so as to avoid redundant description. In the drawings, proportions are not necessarily drawn to scale.

FIG. 1 illustrates an optical fiber 1 according to an embodiment of the present invention, wherein section (a) is a sectional view of the optical fiber 1 taken along a plane perpendicular to the fiber axis, and section (b) is a conceptual diagram showing the refractive index profile of the optical fiber 1. The optical fiber includes, as its glass portion, a core 11, a first cladding 12, a second cladding 13, and a third cladding 14. A carbon coated layer 15 is disposed on a surface of the glass portion. A primary resin layer 16 and a secondary resin layer 17 are disposed around the carbon coated layer in this order. FIG. 1 shows a refractive index profile having a simple structure, in which each section of the optical fiber 1 has a constant refractive index. However, those skilled in the art can readily conceive of similar structures (for example, a structure in which the refractive index in each section is inclined or has fluctuations due to a manufacturing method).

The core 11 has a radius $r_1$ and a refractive index $n_1$. The first cladding 12, which surrounds the core 11, has an inner radius $r_1$, an outer radius $r_2$, and a refractive index $n_2$ that is smaller than the refractive index $n_1$. The second cladding 13, which surrounds the first cladding 12, has an inner radius $r_2$, an outer radius $r_3$, and a refractive index $n_3$ that is smaller than the refractive index $n_2$. The third cladding 14, which surrounds the second cladding 13, has an inner radius $r_3$ and a refractive index $n_4$ that is greater than the refractive index $n_3$. For the optical fiber 1, the values of the radii $r_1$, $r_2$, $r_3$, etc., are determined by positions at which the refractive index maximally changes. However, for an embodiment of an optical fiber having a gently sloped profile, the values of the radii may be determined as those of an optically equivalent step-like profile.

In this description, the relative refractive index difference $\Delta$ of a portion having a refractive index n is expressed relative to the refractive index $n_4$ of the third cladding 14 as $$\Delta = \frac{n - n_4}{n_4}.$$

For the optical fiber 1, the relative refractive index difference $\Delta_1$ of the core 11 is in the range of 0.3% to 0.38%, the relative refractive index difference $\Delta_2$ of the first cladding 12 is in the range of −0.3% to 0.2%, and the relative refractive index difference $\Delta_3$ of the second cladding 13 is in the range of −1.8% to −0.5%.

For the optical fiber 1, the inner radius $r_2$ and the outer radius $r_3$ of the second cladding 13 satisfy the expression, $$0.4r_2 + 10.5 < r_3 < 0.2r_2 + 16,$$

wherein the inner radius $r_2$ of the second cladding 13 is equal to or greater than 8 Moreover, for the optical fiber 1, the bending loss at a wavelength of 1550 nm and at a radius of curvature of 7.5 mm is smaller than 0.1 dB/turn; and the bending loss at a wavelength of 1625 nm, which is the wavelength of monitor light of an optical transmission system, and at a radius of curvature of 4 mm is greater than 0.1 dB/turn.

There are three methods of making the second cladding 13, the method including: a first method, in which a core rod including the core and a first cladding is deposited by the outside vapor deposition (OVD) method and sintered in an atmosphere of $SiF_4$; a second method, in which $SiO_2$ particles to which fluorine has been doped are directly sprayed onto a core rod by outside plasma vapor deposition; and a third method, in which a rod-in-tube process is performed using a glass pipe to which fluorine has been doped with a predetermined concentration. In general, according to the first method, the obtained fluorine-doped $SiO_2$ has a low OH concentration, but the relative refractive index difference $\Delta_3$ is attainable only in a range of equal to or greater than −0.75%. On the other hand, according to the second method, the relative refractive index difference $\Delta_3$ can be attainable in a range of equal to or greater than −2%.

If the carbon coated layer 15 is not disposed on a surface of the glass portion, the static fatigue coefficient n is in the range of 20 to 25. By disposing the carbon coated layer 15 on a surface of the glass portion, the static fatigue coefficient n can be made greater than 30. Thus, even when the radius of curvature is small, long term reliability is secured.

The primary resin layer 16 and the secondary resin layer 17 are as described below. It is preferable that the primary resin layer 16 have a Young's modulus smaller than 1.1 MPa and the secondary resin layer 17 have a Young's modulus greater than 600 MPa. Thus, microbending characteristics superior to those of standard SMFs (Single-Mode Fibers) can be attained, and a loss increase, which temporarily occurs during installation, can be significantly suppressed.

FIG. 2 is a table of attributes of optical fibers A to D, which are embodiments of the present invention, and attributes of optical fibers E to J, which are comparative examples. The table shows, from left to right, the radius $r_1$ of the core 11, the outer radius $r_2$ of the first cladding 12, the outer radius $r_3$ of the second cladding 13, the relative refractive index difference $\Delta_1$ of the core 11, the relative refractive index difference $\Delta_2$ of the first cladding 12, and the relative refractive index difference $\Delta_3$ of the second cladding 13. Moreover, the table shows the bending loss at a wavelength of 1625 nm and at a radius of curvature of 4 mm, the bending loss at a wavelength of 1550 nm and at a radius of curvature of 5 mm, the bending loss at a wavelength of 1550 nm and at a radius of curvature of 7.5 mm, the bending loss at a wavelength of 1550 nm and at a radius of curvature of 10 mm, the mode field diameter MFD at 1310 nm, the cable cut-off wavelength λcc, the dispersion slope at the zero dispersion wavelength, and the zero dispersion wavelength $\lambda_0$.

Each of the optical fibers A to D satisfies the G. 652 standard, and has a bending loss smaller than 0.1 dB/turn at a wavelength of 1550 nm and at a radius of curvature of 7.5 mm. Each of the optical fibers A to D has a bending loss larger than 0.1 dB/turn at a wavelength of 1625 nm, which is the wavelength of monitor light of an optical transmission system, and at a radius of curvature of 4 mm. As described below, by utilizing this property, the optical fiber can be prevented from being used in a range where reliability decreases. On the other hand, the optical fiber E to J do not comply with the G. 652 standard, or, have bending losses greater than 0.1 dB/turn at a wavelength of 1550 nm and at a radius of curvature of 7.5 mm.

Figure 3:
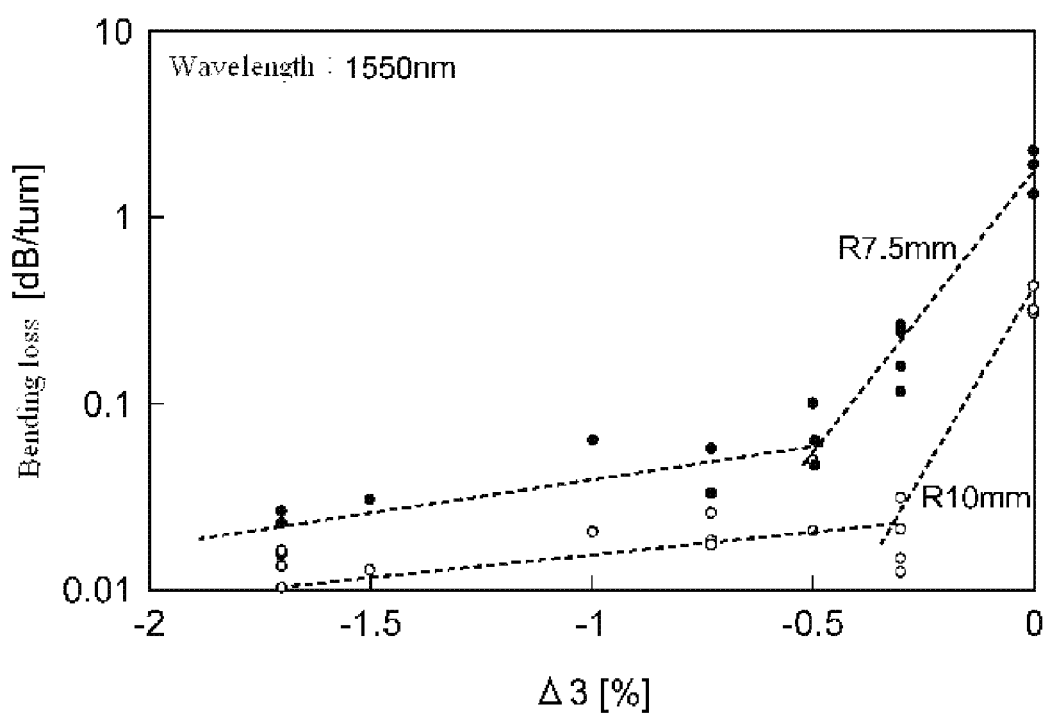
FIG. 3 is a graph showing a relationship between the relative refractive index difference of a second cladding and the bending loss at a wavelength of 1550 nm.

FIG. 3 is a graph showing a relationship between the relative refractive index difference $\Delta_3$ and the bending loss at a wavelength of 1550 nm. In the graph, the radius of curvature is 7.5 mm or 10 mm. As the absolute value of the relative refractive index difference $\Delta_3$ becomes greater, the bending loss becomes smaller. When the radius of curvature is 7.5 mm, if the relative refractive index difference $\Delta_3$ is equal to or smaller than −0.5%, the bending loss is smaller than 0.1 dB/turn.

Figure 4:
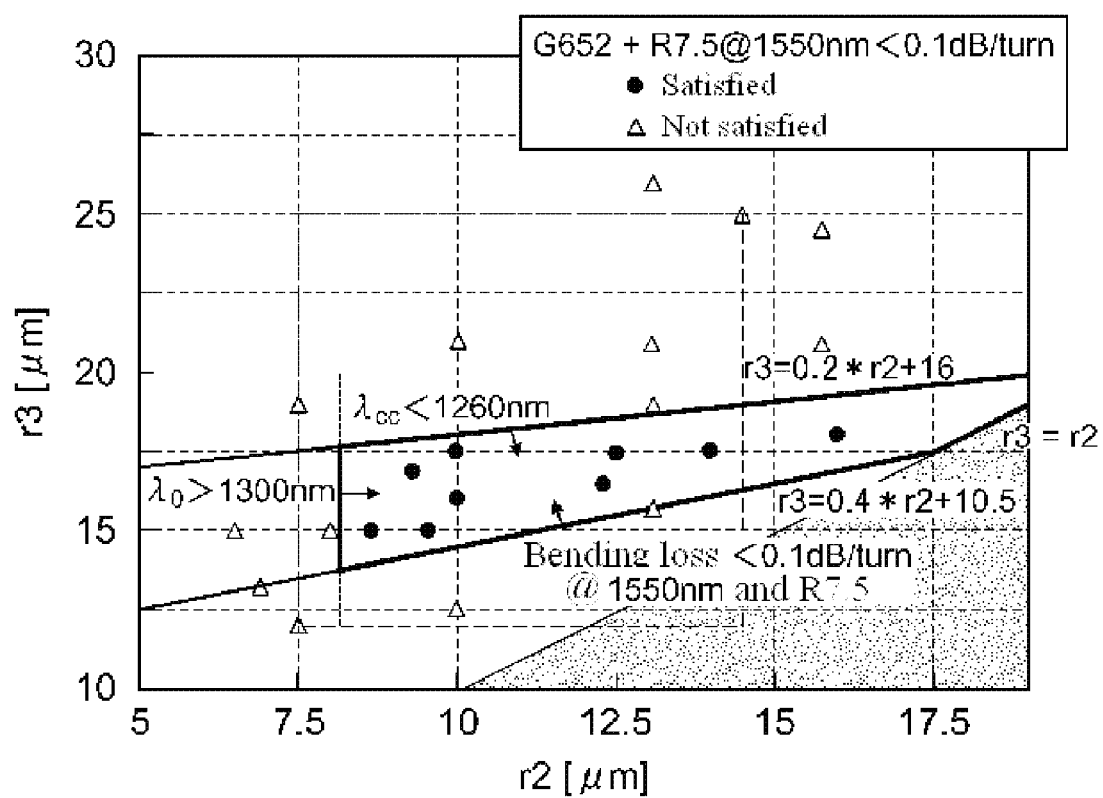
FIG. 4 is a graph showing a region in which the G. 652 standard is satisfied and the bending loss is smaller than 0.1 dB/turn at a wavelength of 1550 nm and at a radius of curvature of 7.5 mm, regarding the inner radius $r_2$ and the outer radius $r_3$ of the second cladding.

FIG. 4 is a graph showing a region in which the G. 652 standard is satisfied and the bending loss is smaller than 0.1 dB/turn at a wavelength of 1550 nm and at a radius of curvature of 7.5 mm, regarding the inner radius $r_2$ and the outer radius $r_3$ of the second cladding 13. In FIG. 4, the cases when the two conditions are satisfied are shown by solid dots, and the cases when none of the conditions are satisfied are shown by hollow triangles.

In FIG. 4, if "$r_3<0.2r_2+16$", the cable cut-off wavelength λcc is equal to or smaller than 1260 nm. If "$r_3>0.4r_2+10.5$", the bending loss is smaller than 0.1 dB/turn at a wavelength of 1550 nm and at a radius of curvature of 7.5 mm. If the inner radius $r_2$ of the second cladding 13 is greater than 8 μm, the zero dispersion wavelength $\lambda_0$ is greater than 1300 nm. An optical fiber according to the present invention satisfies the expression, $$0.4r_2+10.5<r_3<0.2r_2+16,$$

and the inner radius $r_2$ of the second cladding 13 is equal to or greater than 8 μm. Therefore, the optical fiber satisfies the G. 652 standard, and has a small bending loss at a signal light wavelength, in that the bending loss at a wavelength of 1550 nm and at a radius of curvature of 7.5 mm is equal to or smaller than 0.1 dB/turn.

Figure 5:
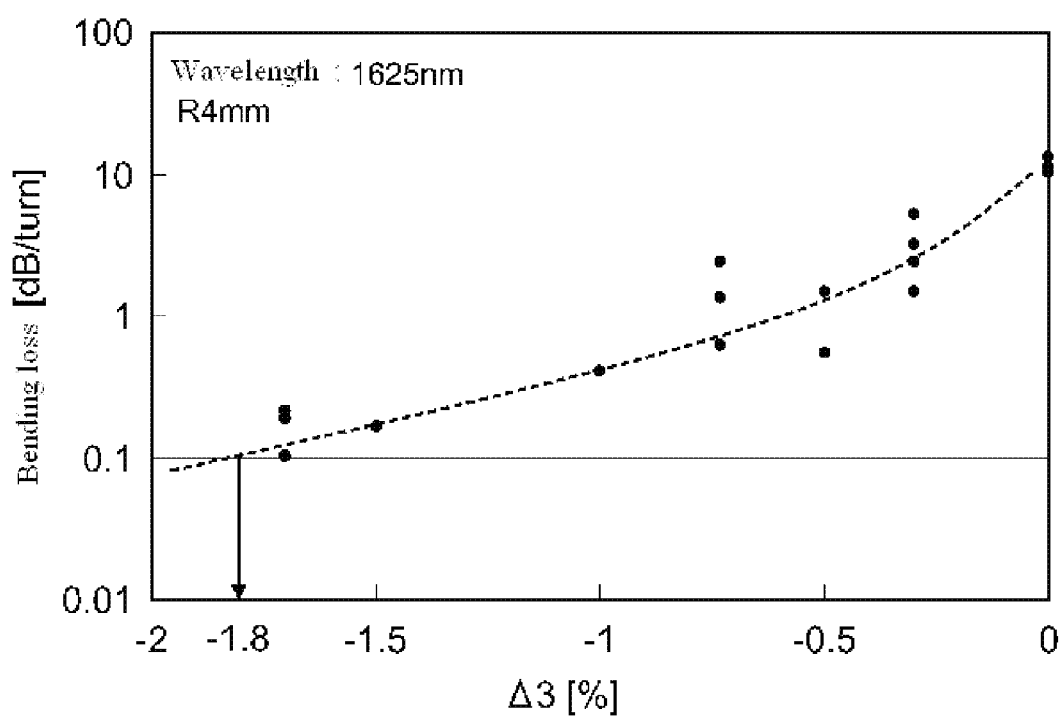
FIG. 5 is a graph showing a relationship between the relative refractive index difference of the second cladding and the bending loss at a wavelength of 1625 nm.

FIG. 5 is a graph showing a relationship between the relative refractive index difference $\Delta_3$ and the bending loss at a wavelength of 1625 nm. In this case, the radius of curvature is 4 mm. Also for the wavelength of 1625 nm, as the absolute value of the relative refractive index difference $\Delta_3$ becomes greater, the bending loss becomes smaller.

Figure 6:
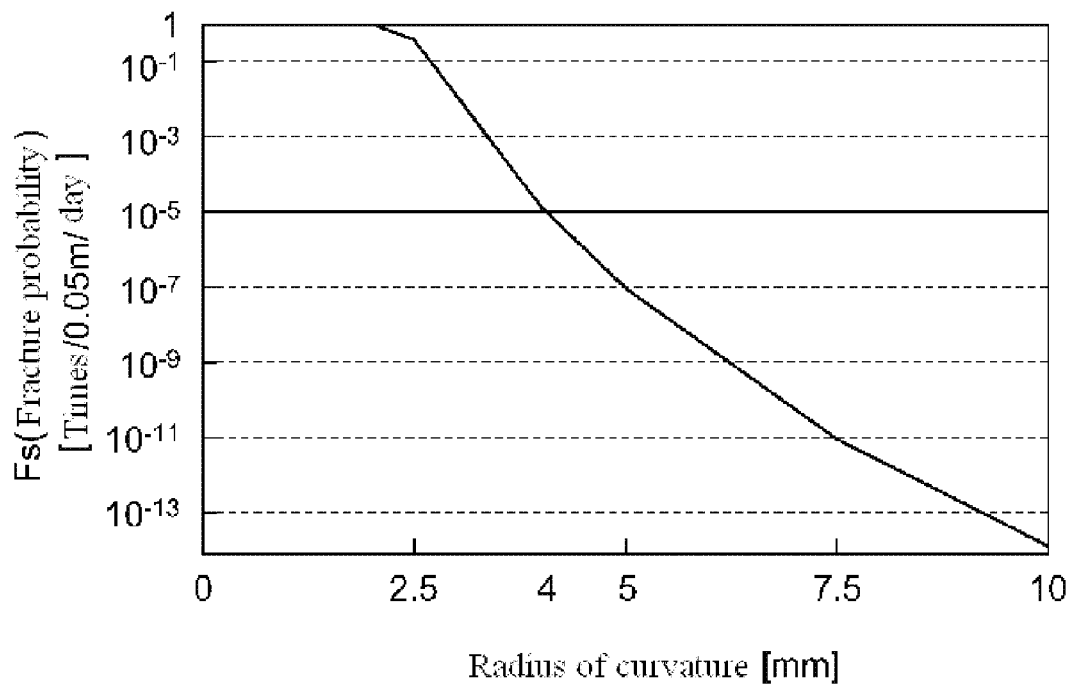
FIG. 6 is a graph showing a relationship between the radius of curvature and the fracture probability Fs.

FIG. 6 is a graph showing a relationship between the radius of curvature and the fracture probability Fs. The fracture probability Fs is defined by the expression, $$F_S = 1 - \exp\left\{-N_P L\left(\frac{m}{n-2}\frac{k_s}{\sigma^{np}t_{pe}}\right)\right\}$$

(see "J. Appl. Phys. 53 (7), 1982"). Here, the used length L is 0.05 m, the static fatigue coefficient n is 23, the m-value m is 3, the screening strength $\sigma^{np}$ (2% extension) is 0.02, the screening time $t_{pe}$ is 0.6 seconds, and the fracture frequency $N_p$ during screening is 1/100000 km. As the radius of curvature of an optical fiber becomes smaller, the fracture probability Fs becomes higher.

As can be seen from FIGS. 5 and 6, if the relative refractive index difference $\Delta_3$ of an optical fiber is equal to or greater than −1.8% and the optical fiber is bent with a radius of curvature of 4 mm for which the fracture probability Fs per day is as high as $10^{-5}$ times/0.05 m, the bending loss becomes equal to or greater than 0.1 dB/turn at a wavelength of 1625 nm. An optical fiber according to the present invention has a relative refractive index difference $\Delta_3$ equal to or greater than −1.8% and a bending loss equal to or greater than 0.1 dB/turn at a wavelength of 1625 nm and at a radius of curvature of 4 mm. Therefore, using monitor light of a wavelength of 1625 nm, it is possible to detect whether or not the optical fiber is bent with a radius of curvature equal to or smaller than 4 mm, at which reliability cannot be assured. Thus, it is possible to prevent the optical fiber from being fractured when the optical fiber is accidentally bent during installation or other operations.

Figure 7:
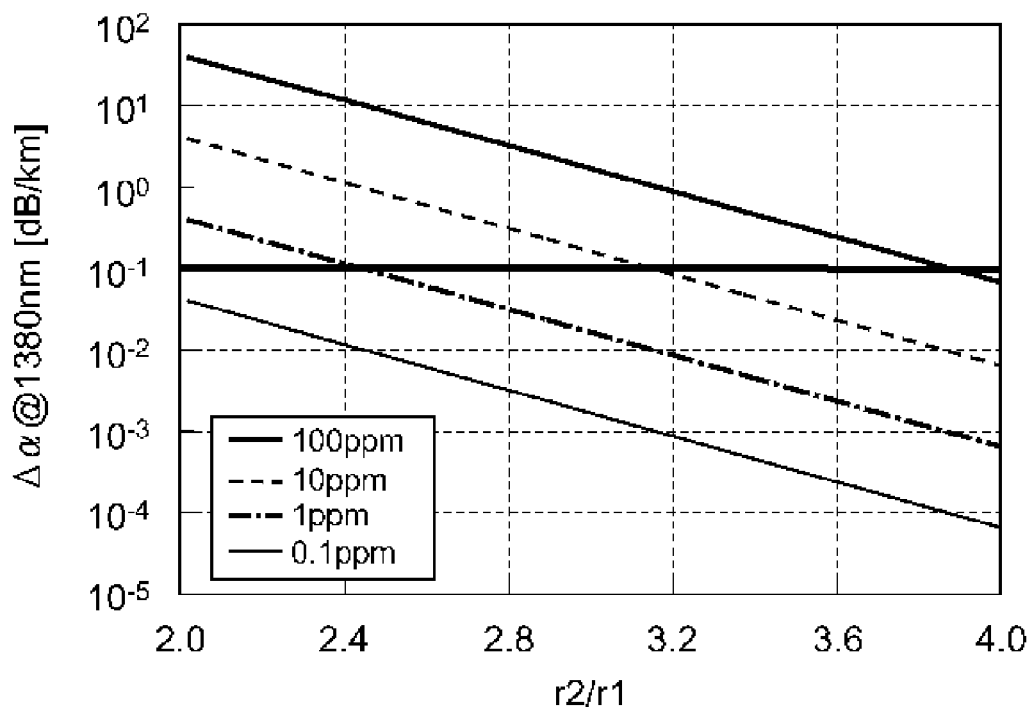
FIG. 7 is a graph showing a relationship between the ratio ($r_2/r_1$) and the loss increase due to OH at a wavelength of 1380 nm.

FIG. 7 is a graph showing a relationship between the ratio ($r_2/r_1$) and the loss increase due to OH at a wavelength of 1380 nm. When the relative refractive index difference $\Delta_1$ is 0.35% and the radius of the core 11 is 4.1 μm, the loss increase $\Delta\alpha$ at a wavelength of 1380 nm due to OH (concentration of $C_{OH}$ ppm) in the second cladding 13 is given by the expression, $$\Delta_\alpha = 310 \times C_{OH} \exp\left(-3.3 \times \frac{r_2}{r_1}\right).$$

It is necessary that the loss increase $\Delta\alpha$ be smaller than 0.1 dB/km so that the loss at a wavelength of 1380 nm be smaller than 0.38 dB/km. By modifying this expression, the range of the ratio ($r_2/r_1$) that satisfies "$\Delta\alpha<0.1$ dB/km" is given by the expression, $$\frac{r_2}{r_1} > -\frac{1}{3.3} \times \ln\left(\frac{0.1}{310 \times C_{OH}}\right).$$

If fluorine concentration in the second cladding 13 is increased so as to decrease the relative refractive index difference $\Delta_3$, the hydrogen durability deteriorates. In general, if a high concentration of fluorine is doped to $SiO_2$ glass by plasma CVD method so that $\Delta<-0.8\%$ is satisfied, OH concentration in the glass increases, which causes increase in the transmission loss. However, by setting the range of the ratio ($r_2/r_1$) as described above, the loss at a wavelength of 1380 nm can be made smaller than 0.38 dB/km, so that the optical fiber securely complies with the G. 652D standard (G. 652 standard+low OH concentration). It is more preferable that the ratio ($r_2/r_1$) be set so that the expression, $$\frac{r_2}{r_1} > -\frac{1}{3.3} \times \ln\left(\frac{0.1}{100 \times C_{OH}}\right)$$

is satisfied.

It is preferable that, for the same radius of curvature, the fluctuation of the increase in bending loss along the length of optical fiber 1 be equal to or less than 10%. In this case, since there is a correspondence between a bend radius and a bending loss of the optical fiber, accidental bending of a portion of the optical fiber can be readily detected by monitoring an increase in the bending loss during installation.

Figure 8:
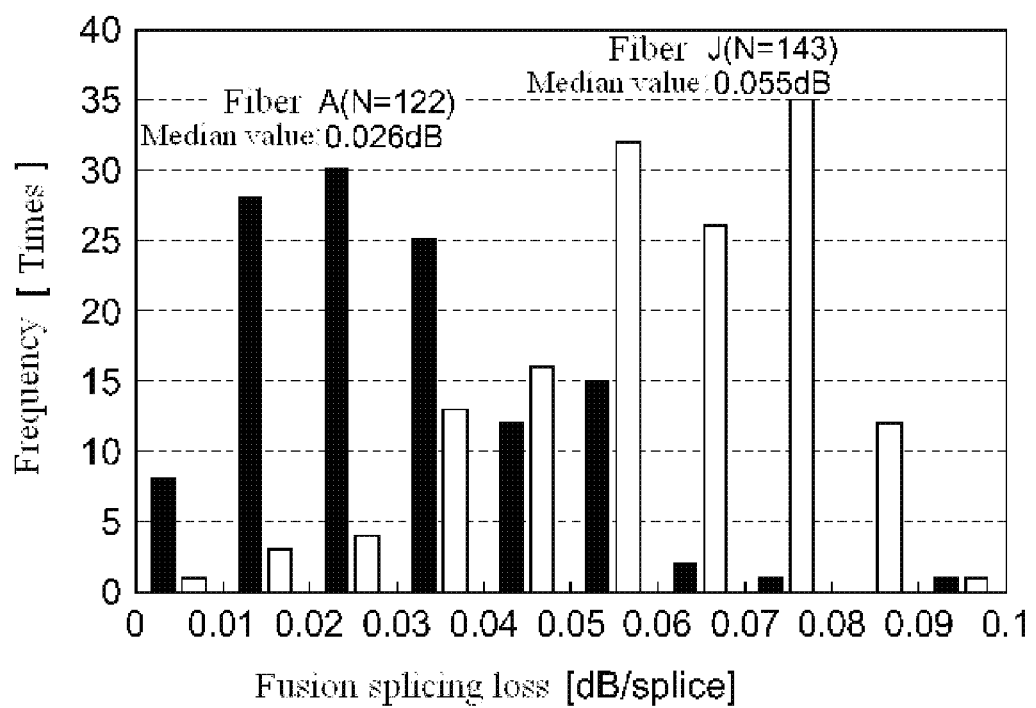
FIG. 8 is a histogram of the fusion splicing loss when the optical fibers A and J are fusion spliced to standard SMFs.

FIG. 8 is a histogram of the fusion splicing loss when the optical fibers A and J are fusion spliced to standard SMFs. The mode field diameter of the optical fiber A is 8.9 μm, and the mode field diameter of the optical fiber J is 8.3 μm. The mode field diameter of the standard SMFs is 9.2 μm. Thus, the fusion splicing loss of the optical fiber A occurring when the optical fiber A is fusion spliced to a standard SMF is small. For an optical fiber according to the present invention, it is preferable that the mode field diameter at a wavelength of 1310 nm be in the range of 8.6 μm to 9.2 μm, and the mode field diameter at a wavelength of 1550 nm be in the range of 9.6 μm to 10.5 μm.

Figure 9:
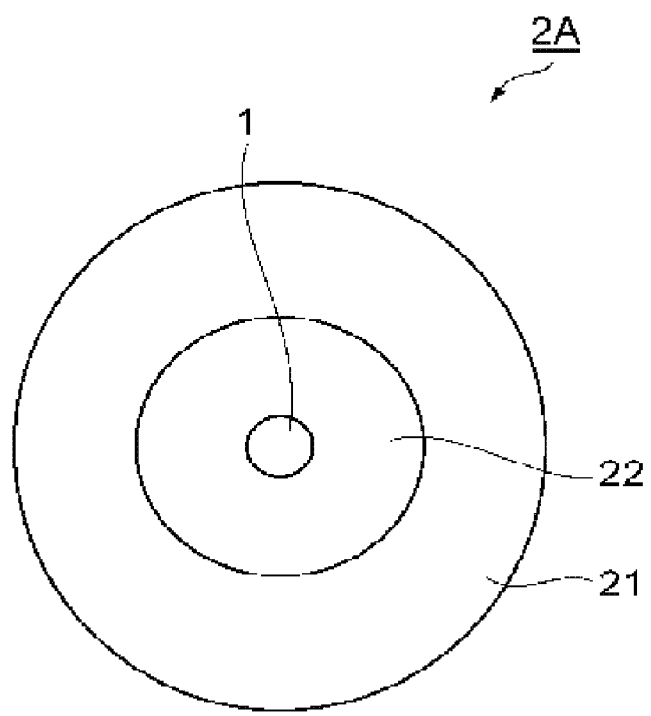
FIG. 9 is a sectional view of an optical cable of a loose cable type according to an embodiment of the present invention.

Hereinafter, embodiments of optical cables each including the optical fiber according to the present invention are described. FIG. 9 is a sectional view of an optical cable 2A of a loose cable type according to an embodiment of the present invention. The optical cable 2A includes the optical fiber 1 according to the present invention, a sheath 21 disposed around the optical fiber 1, and Kevlar (tension member) 22 disposed between the optical fiber 1 and the sheath 21. The optical cable 2A allows the radius of curvature to be decreased while preventing fracture of the optical fiber 1.

Figure 10:
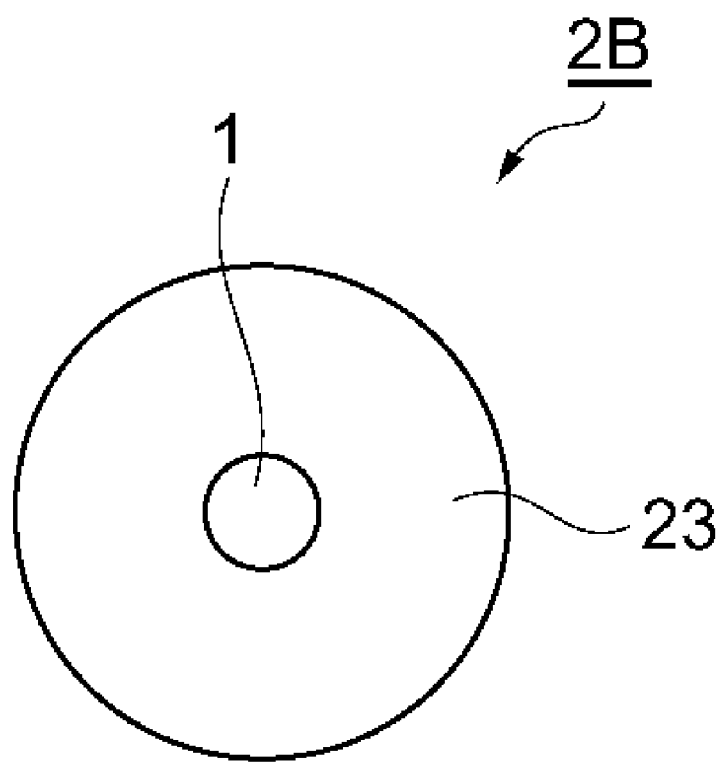
FIG. 10 is a sectional view of an optical cable of a tight-jacketed type according to an embodiment of the present invention.

FIG. 10 is a sectional view of an optical cable 2B of a tight-jacketed type according to an embodiment of the present invention. The optical cable 2B includes the optical fiber 1 according to the present invention and a sheath 23 covering the optical fiber 1, but does not include Kevlar. The outer diameter of the optical cable is smaller than 3 mm. By employing the optical fiber 1, the tight-jacketed optical cable 2B can be made thin, resistant to bending even without using Kevlar, and excellent in terms of storability. Moreover, notwithstanding the tight-jacketed type, the cable 2B can make the loss increase be smaller than 0.1 dB/km at a temperature of −30° C. and at a wavelength of 1550 nm.

Figure 11:
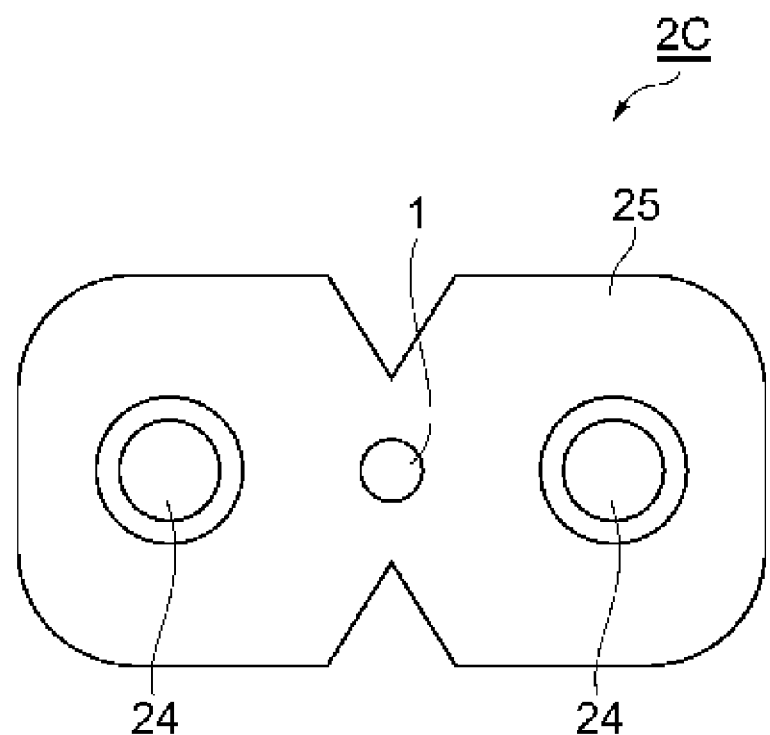
FIG. 11 is a sectional view of an optical cable of a drop optical cable type according to an embodiment of the present invention.

FIG. 11 is a sectional view of an optical cable 2C of a drop cable type according to an embodiment of the present invention. The optical cable 2C includes the optical fiber 1 according to the present invention, tension members 24 disposed parallel to the optical fiber 1, and a sheath 25 covering the optical fiber 1 and the tension members 24. The two tension members 24 are disposed with the optical fiber 1 therebetween. A polyethylene sheath is disposed around the tension member 24. Moreover, grooves are formed in surfaces of the sheath 24 on both sides of the optical fiber 1. The sheath 24 can be split along the grooves so that the optical fiber 1 can be readily pulled out. The optical cable 2C allows the radius of curvature to be decreased while preventing fracture of the optical fiber 1.

Figure 12:
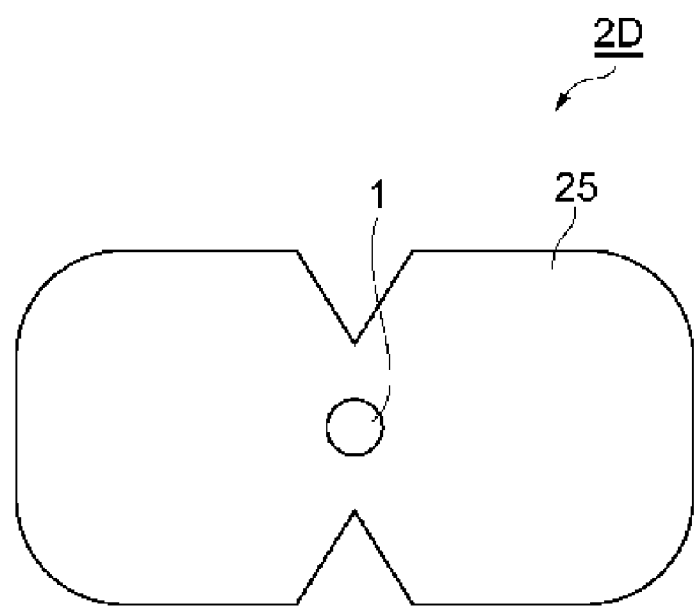
FIG. 12 is a sectional view of an optical cable of a drop optical cable type according to an embodiment of the present invention.

FIG. 12 is a sectional view of an optical cable 2D of a drop cable type according to an embodiment of the present invention. The optical cable 2D includes the optical fiber 1 according to the present invention and a sheath 25 covering the optical fiber, but does not include a tension member. Grooves are formed in surfaces of the sheath 25 along the optical fiber 1. Since the bending loss can be reduced by employing the optical fiber 1, a tension member is omitted in the optical cable 2D. Since the optical cable 2D does not include a tension member, the cross-sectional area of the sheath 25 can be decreased, whereby the cable can be stored in a small space.

Figure 13:
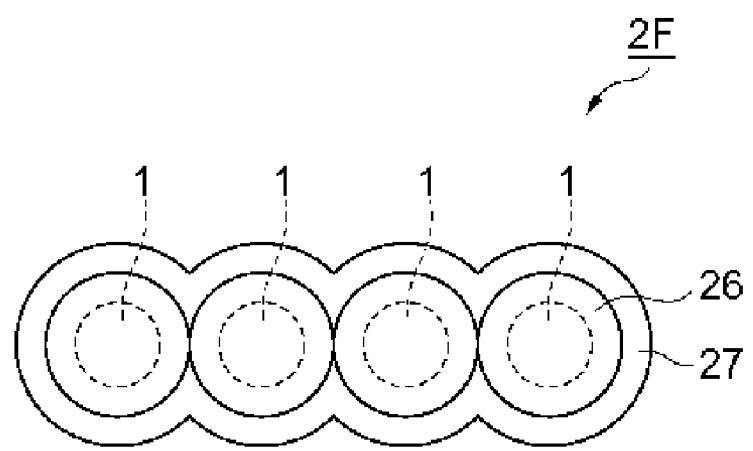
FIG. 13 is a sectional view of an optical cable of a ribbon fiber type according to an embodiment of the present invention.
Figure 14:
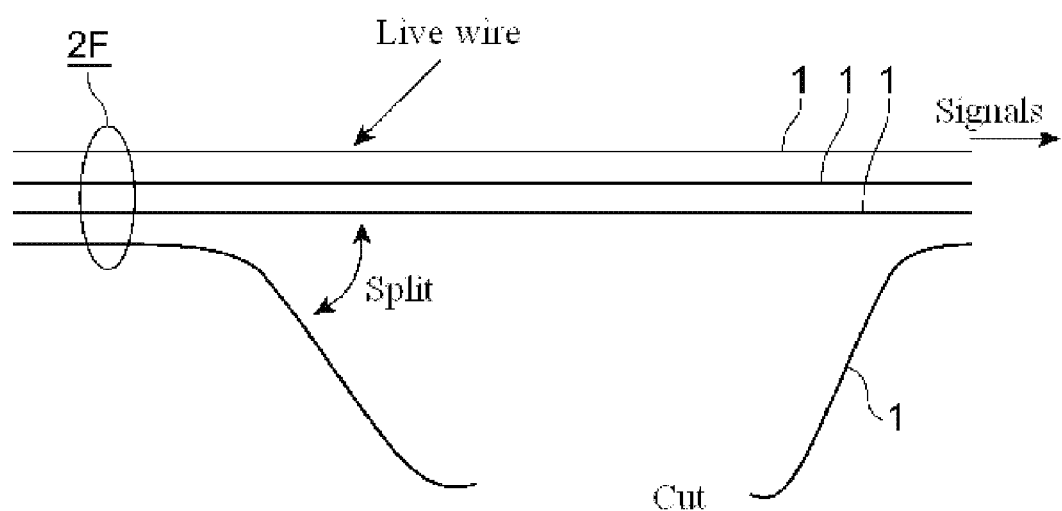
FIG. 14 is a conceptual diagram showing how fibers of the optical cable shown in FIG. 13 are split.

FIG. 13 is a sectional view of an optical cable 2F of a ribbon fiber type according to an embodiment of the present invention. The optical cable 2F includes a plurality of the optical fibers 1 according to the present invention. The plurality of optical fibers 1 are each covered with a colored ink layer 26, arranged in parallel, and covered with resin 27. Since the cable employs the optical fiber 1 so that it has a low bending loss, when the fibers formed into a ribbon shape are split and cut (FIG. 14), the loss increase of optical fibers (live wires), through which signal light is being transmitted, can be suppressed. Thus, during a splitting operation, the loss increase of live wires at a wavelength of 1550 nm can be made smaller than 0.5 dB/km/s, so that instantaneous interruption of signal light can be prevented. Moreover, it is not necessary to use a split jig so as to reduce the stress applied to the optical fiber 1 during splitting, so that the optical fibers can be split by hand.

Figure 15:
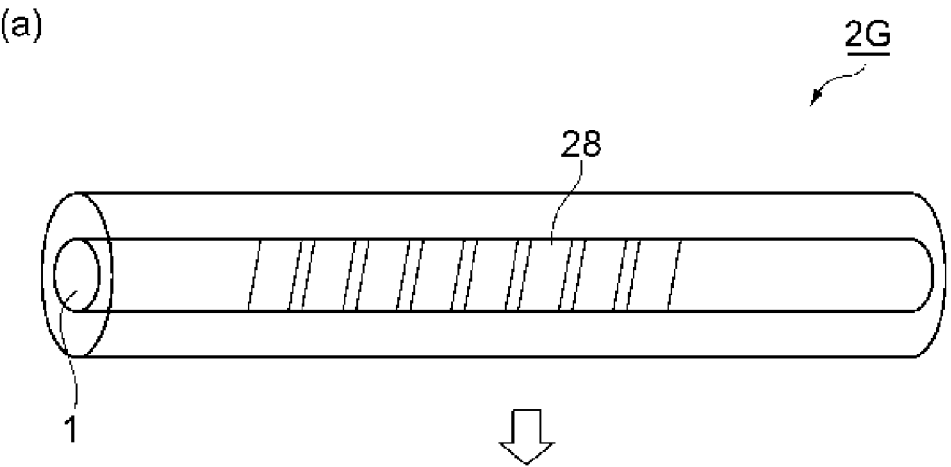
In FIG. 15, section (a) is a conceptual diagram of an optical cable according to an embodiment of the present invention, the cable having a helical protective structure, and section (b) is a conceptual diagram of the optical cable from which a sheath has been removed.
Figure 15:
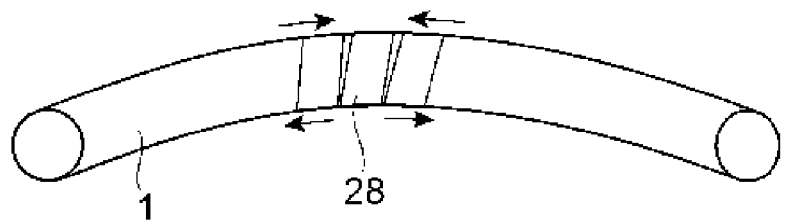

In FIG. 15, section (a) is a conceptual diagram of an optical cable 2G according to an embodiment of the present invention having a helical protective structure 28, and section (b) is a conceptual diagram of the optical cable 2G from which a sheath has been removed. The optical cable 2G includes the optical fiber 1 according to the present invention, and the helical protective structure 28, which is made of a polyamide synthetic fiber (nylon) strip, surrounding the optical fiber 1. By providing the helical structure 28 around the optical fiber 1, the optical fiber can be made more resilient to bending exceeding a certain degree. Thus, the optical fiber is prevented from being bent by a radius of curvature smaller than the curvature at which the reliability decreases.

Figure 16:
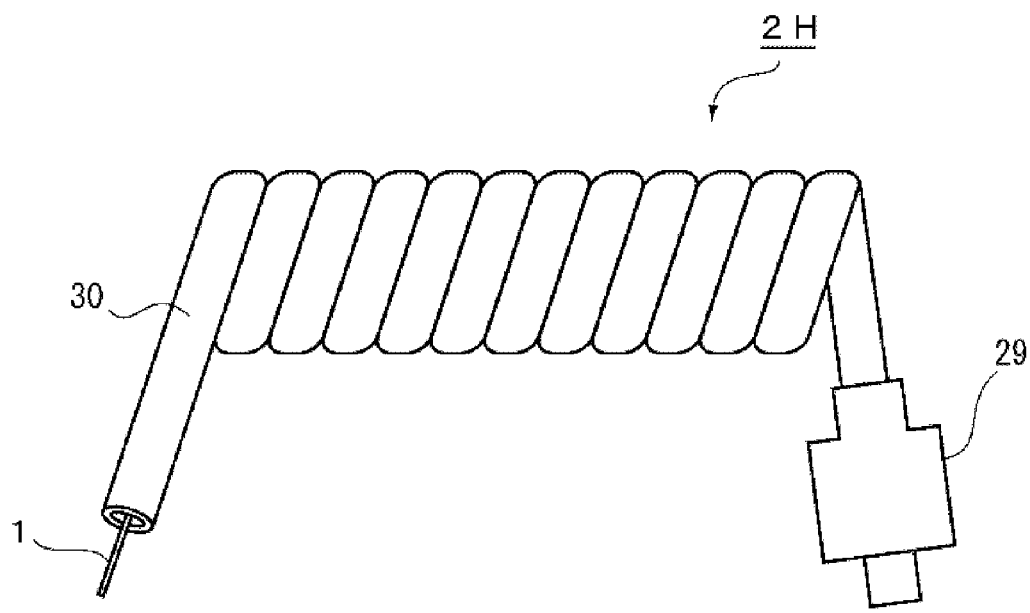
FIG. 16 is a perspective view of an optical cable (optical curled cord) according to an embodiment of the present invention.

FIG. 16 is a perspective view of an optical cable 2H (also referred to as an optical curled cord) according to an embodiment of the present invention. The optical cable 2H includes the optical fiber 1 according to the present invention that is helically coiled with a radius of curvature equal to or smaller than 7.5 mm, and an optical connector 29 connected to an end of the optical fiber 1. Since the optical fiber 1 is employed, although the optical fiber 1 is helically coiled with a radius of curvature equal to or smaller than 7.5 mm, the loss increase is small.

Figure 17:
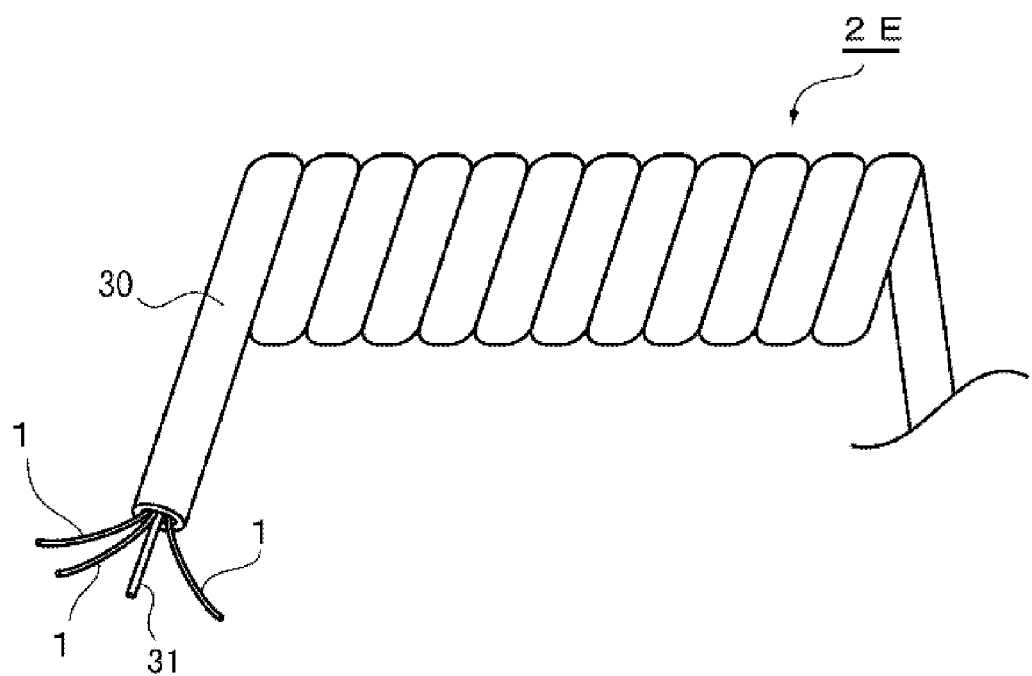
FIG. 17 is a perspective view of an optical cable (optical curled cord) according to an embodiment of the present invention.

FIG. 17 is a perspective view of an optical cable 2E (also referred to as an optical curled cord) according to an embodiment of the present invention. The optical cable 2E includes a plurality of the optical fibers 1 according to the present invention, each of which are coiled with a radius of curvature equal to or smaller than 7.5 mm; a sheath 30 covering the plurality of optical fibers 1; and a tension member 31 at the center thereof. The optical cable 2E allows individual optical fibers 1 to be pulled out and used.

Figure 18:
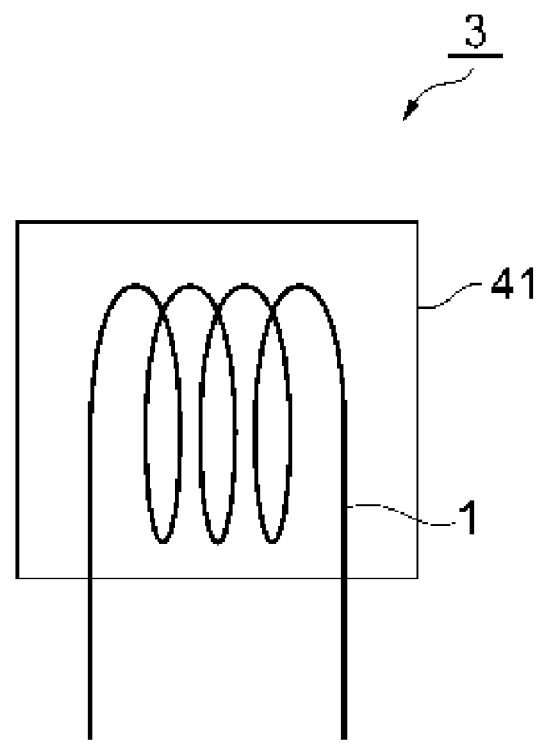
FIG. 18 is a conceptual diagram of an optical module according to an embodiment of the present invention.
Figure 19:
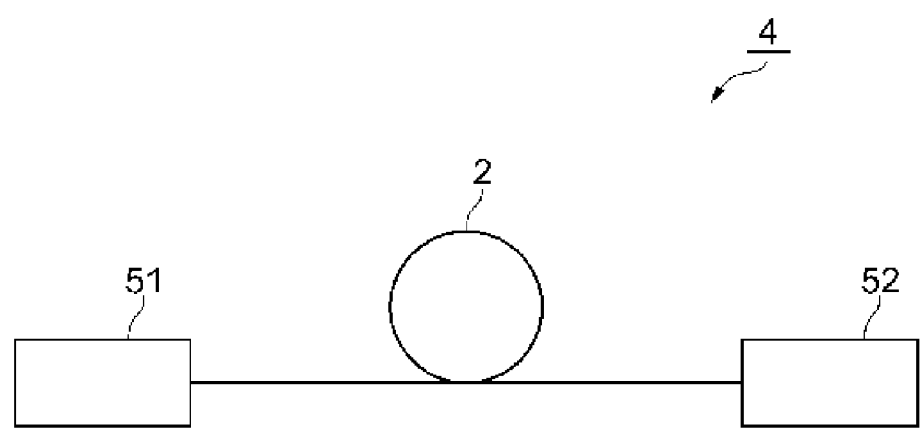
FIG. 19 is a conceptual diagram of an optical transmission system according to an embodiment of the present invention.

It is preferable that, as shown in FIG. 18, an optical module 3 be configured such that the optical fiber 1 according to the present invention is coiled and stored in a case 41. It is preferable that, as shown in FIG. 19, an optical transmission system 4 be configured such that one of the optical cables 2A to 2H according to the embodiments is used as an optical transmission path 2 and signal light output from an optical transmitter 51 is transmitted to an optical receiver 52 through the optical transmission path 2. With the module or the system, the bending loss can be reduced at a radius of curvature of equal to or smaller than 7.5 mmφ while readily preventing fracture of the optical fiber 1, so that the system can be made small and the operation space for wiring can be simplified.

Industrial Applicability

The present invention is applicable to an optical transmission system, such as FTTH and FTTC, so as to store an optical cable with a small diameter and prevent fracture of the optical fiber.

The invention claimed is:

1. An optical fiber comprising a core having a refractive index $n_1$, a first cladding surrounding the core and having a refractive index $n_2$ smaller than the refractive index $n_1$, a second cladding surrounding the first cladding and having a refractive index $n_3$ smaller than the refractive index $n_2$, and a third cladding surrounding the second cladding and having a refractive index $n_4$ greater than the refractive index $n_3$, wherein, with respect to the refractive index $n_4$ of the third cladding, the relative refractive index difference of the core is in the range of 0.3% to 0.38%, the relative refractive index difference of the first cladding is in the range of −0.3% to 0.2%, and the relative refractive index difference of the second cladding greater than −1.8%, wherein the inner radius $r_2$ of the second cladding and the outer radius $r_3$ of the second cladding satisfy the expression, $0.4r_2+10.5<r_3<0.2r_2+16$, and the inner radius $r_2$ of the second cladding is equal to or greater than 8 μm, and wherein the bending loss at a wavelength of 1550 nm and at a radius of curvature of 7.5 mm is smaller than 0.1 dB/turn, and, and the radius $r_1$ of the core and the outer radius $r_2$ of the first cladding satisfy the expression, $$\frac{r_2}{r_1} > -\frac{1}{3.3} \times \ln\left(\frac{0.1}{310 \times C_{OH}}\right),$$

and the transmission loss at a wavelength of 1380 nm is smaller than 0.38 dB/km.

2. The optical fiber according to claim 1 wherein the mode field diameter at a wavelength of 1310 nm is in the range of 8.6 μm to 9.2 μm, and the mode field diameter at a wavelength of 1550 nm is in the range of 9.6 μm to 10.5 μm.

3. The optical fiber according to claim 1, wherein a carbon coated layer is disposed on a surface of a glass portion of the optical fiber.

4. An optical cable comprising:
the optical fiber according to claim 1;
a sheath disposed around the optical fiber; and
Kevlar disposed between the optical fiber and the sheath.

5. An optical cable comprising:
the optical fiber according to claim 1; and
a sheath covering the optical fiber,
wherein the optical cable does not include Kevlar, and the optical cable has an outer diameter smaller than 3 mm.

6. The optical cable according to claim 5,
wherein a loss increase is smaller than 0.1 dB/km at a wavelength of 1550 nm and at a temperature of −30° C.

7. An optical cable comprising:
the optical fiber according to claim 1;
a tension member disposed parallel to the optical fiber; and
a sheath covering the optical fiber and the tension member,
wherein a groove is formed along the optical fiber in a surface of the sheath.

8. An optical cable comprising:
the optical fiber according to claim 1; and
a sheath covering the optical fiber,
wherein the optical cable does not include a tension member, and a groove is formed along the optical fiber in a surface of the sheath.

9. An optical cable comprising a plurality of the optical fibers according to claim 1,
wherein the plurality of optical fibers are arranged in parallel and integrally covered with resin, and a loss increase during a mid-span access for wire splitting operation is smaller than 0.5 dB/km/s at a wavelength of 1550 nm.

10. An optical cable comprising:
the optical fiber according to claim 1; and
a sheath covering the optical fiber that is helically coiled,
wherein the radius of curvature of the optical fiber is equal to or smaller than 7.5 mm.

11. An optical cable comprising:
a plurality of the optical fibers according to claim 1; and
a sheath covering the plurality of optical fibers that are helically coiled,
wherein the radius of curvature of each of the plurality of optical fibers is equal to or smaller than 7.5 mm.

12. An optical module storing the optical fiber according to claim 1.

13. An optical transmission system that transmits signal light using the optical cable according to claim 4.

14. An optical transmission system that transmits signal light using the optical cable according to claim 5.

15. An optical transmission system that transmits signal light using the optical cable according to claim 7.

16. An optical transmission system that transmits signal light using the optical cable according to claim 8.

17. An optical transmission system that transmits signal light using the optical cable according to claim 9.

18. An optical transmission system that transmits signal light using the optical cable according to claim 10.

19. An optical transmission system that transmits signal light using the optical cable according to claim 11.

* * * * *